United States Patent
Kaji et al.

(10) Patent No.: US 7,836,925 B2
(45) Date of Patent: Nov. 23, 2010

(54) PNEUMATIC TIRE HAVING WEARING REGION SANDWICHED BY FIRST AND SECOND SIPES

(75) Inventors: Shinichi Kaji, Osaka (JP); Yuichi Nakamura, Osaka (JP); Hiroaki Sugimoto, Osaka (JP); Harunobu Suita, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 810 days.

(21) Appl. No.: 11/728,531

(22) Filed: Mar. 26, 2007

(65) Prior Publication Data

US 2007/0227638 A1 Oct. 4, 2007

(30) Foreign Application Priority Data

Mar. 29, 2006 (JP) .............................. 2006-091071

(51) Int. Cl.
*B60C 11/01* (2006.01)
*B60C 11/12* (2006.01)

(52) U.S. Cl. ...................... 152/209.16; 152/209.25; 152/209.27; 152/DIG. 3

(58) Field of Classification Search ............ 152/209.16, 152/209.25, 209.27, DIG. 3
See application file for complete search history.

(56) References Cited

U.S. PATENT DOCUMENTS

| | | | | |
|---|---|---|---|---|
| 4,756,352 | A | * | 7/1988 | Ogawa et al. .......... 152/DIG. 3 |
| 4,934,424 | A | * | 6/1990 | Kojima ................... 152/DIG. 3 |
| 4,993,466 | A | * | 2/1991 | Ochiai .................... 152/DIG. 3 |
| 5,833,780 | A | | 11/1998 | Kishi et al. |
| 6,991,015 | B2 | | 1/2006 | Kuroda |

FOREIGN PATENT DOCUMENTS

| | | | |
|---|---|---|---|
| EP | 0427543 | A2 | 5/1991 |
| EP | 1314581 | A1 | 5/2003 |
| JP | 02-081704 | * | 3/1990 |
| JP | 03-217304 | * | 9/1991 |
| JP | 04-015108 | * | 1/1992 |
| JP | 05-016615 | * | 1/1993 |
| JP | 5016615 | A | 1/1993 |
| JP | 5-262105 | A | 10/1993 |
| JP | 6-87303 | A | 3/1994 |
| JP | 8183308 | A | 7/1996 |
| JP | 10-193920 | * | 7/1998 |

OTHER PUBLICATIONS

Machine translation for Japan 10-193920 (no date).*
Machine translation for Japan 05-016615 (no date).*

* cited by examiner

*Primary Examiner*—Steven D Maki
(74) *Attorney, Agent, or Firm*—The Webb Law Firm

(57) ABSTRACT

In a pneumatic tire in which a tread with a plurality of grooves 1 and 2 including main grooves 1 extending in the tire circumferential direction formed and in which block 3 is formed on shoulder portions of tread T by grooves 1 and 2, on intersection line L between a surface of tread T and a surface of side portion S, the first sipes 11 extending in the tire circumferential direction R are formed, and the depth direction of the sipes 11 and 12 is parallel to tire equatorial plane C, and the sipes 12 are deeper than the sipes 11 and the sipes 12 are wider than the sipes 11, and height difference between a surface of wearing region 13 and a surface of side portion S is not greater than 2.0 mm.

2 Claims, 3 Drawing Sheets

PNEUMATIC TIRE HAVING WEARING REGION SANDWICHED BY FIRST AND SECOND SIPES

The description of this application claims benefit of priority based on Japanese Patent Application No. 2006-091071, the entire same contents of which are incorporated by reference herein.

BACKGROUND OF THE INVENTION

1. Field of the Invention

The present invention relates to a pneumatic tire with ribs and/or blocks formed on shoulder portions of a tread, and in more detail, it relates to a pneumatic tire with inhibited uneven wear on said shoulder portions.

2. Description of the Prior Art

Uneven wear is likely to occur on shoulder portions of a tread of a pneumatic tire. As the uneven wear progresses, various performances of a tire are degraded, which requires exchange of tires in an early stage. Therefore, in order to inhibit uneven wear, various measures have been taken.

In a pneumatic tire of patent document 1 (Japanese Patent Laid-Open Publication No. Hei 6-87303), two sub-grooves extending in the circumferential direction are provided on both sides that sandwich a grounding end, thereby wearing the region sandwiched by said sub-grooves (wearing region) being sacrificed. Consequently, wearing does not progress further inside of the tire width direction from said region, thereby inhibiting the uneven wear of a tread. In addition, in the pneumatic tire of patent document 2 (Japanese Patent Laid-Open Publication No. Hei 5-262105), three fine grooves extending in the circumferential direction on the outer side of the grounding end including a grounding end are provided. In this case, too, with the sacrifice of a region with said fine grooves formed (wearing region), uneven wear of a tread that is further inside of the tire width direction from said region is inhibited.

At the time of driving, shoulder portions of a tread are subject to the force in lateral direction from a road surface as well as to the force in longitudinal direction. This tendency is particularly remarkable in a tire installed in a front wheel. In the tire of patent document 1, due to the lateral force from a road surface, the region sandwiched by sub-grooves (wearing region) falls inside of the tire width direction, sometimes causing uneven wear for failing to absorb friction energy caused by friction between the tire and the road surface.

In the tire of patent document 2 likewise, since the rigidity of the region with the three fine grooves formed (wearing region) is low, the region falls inside of the tire width direction thereby sometimes degrading the inhibition effect of uneven wear. Further, since provision of the three fine grooves is required, degree of design freedom of a tread pattern is degraded or since controlling said friction energy is difficult, there also lies a problem of crack generation at the groove bottoms of the outer two fine grooves.

Therefore, the object of the present invention is to provide a pneumatic tire capable of effectively inhibiting uneven wear of shoulder portions of a tread against the lateral force from a road surface as well.

SUMMARY OF THE INVENTION

As a result of intensive studies for solving the above mentioned problems, the pneumatic tire of the present invention is characterized in that it is a pneumatic tire provided with a pair of bead portions, a tread, and side portions that connect said bead portions and said tread, with a plurality of grooves that include main grooves extending in the tire circumferential direction formed on said tread, and ribs and/or blocks formed on shoulder portions of said tread by said grooves, wherein on intersection lines between a surface of said tread and a surface of said side portions, first sipes extending in the tire circumferential direction are formed and second sipes extending in the tire circumferential direction are formed further outside of the tire width direction from said first sipes, the depth directions of said first sipes and said second sipes are parallel to the tire equatorial plane, said second sipes are deeper than said first sipes, and said second sipes are wider than said first sipes, and the height difference between a surface of a wearing region sandwiched by said first and second sipes and a surface of said side portion is not greater than 2.0 mm.

In the wearing region sandwiched by the first sipes and the second sipes, the rigidity is lowered due to said sipes. Although said wearing region is more likely to be worn compared with other regions, it absorbs friction energy generated by the friction between the tire and the road surface. As a result, it prevents uneven wear from affecting the inner side of the tire width direction.

The first sipes and the second sipes are formed parallel to a tire equatorial plane. The second sipes outside of the tire width direction is deeper in depth and wider in width than the first sipes. Even by the lateral force from the road surface, the wearing region is hard to fall inside of the tire width direction. As a result, the wearing region can absorb the friction energy enough thereby capable of inhibiting uneven wear. In addition, since sipes are formed on intersection lines between the tread surface and the surface of a side portion as well as the outside of the tire width direction of said intersection lines, a grounding end is not narrowed and tire performances are not degraded, either.

Although the height difference of the surface of a wearing region and the surface of the side portion is preferably 0.0 to 2.0 mm, it is more preferably 0.5 to 2.0 mm. When the height difference is less than 0.5 mm, due to the lateral force applied from the road surface, the wearing region is likely to fall inside of the tire width direction, thereby reducing the effect of inhibiting uneven wear. On the other hand, when the height difference exceeds 2.0 mm, the contact between the wearing region and the road surface is not satisfactory, thereby sometimes reducing the effect of inhibiting uneven wear.

The present invention relates to a pneumatic tire in which the width of said wearing region is 2.5 to 10.0 mm, the width of said first sipes and said second sipes is 0.3 to 2.0 mm and 0.5 to 3.0 mm, respectively, and the depth of said second sipes is 40 to 60% of the depth of said main grooves, and the depth of said first sipes is 45 to 70% of the depth of said second sipe.

It is preferable that the width of a wearing region is 2.5 to 10.0 mm. When the width is less than 2.5 mm, friction energy cannot be absorbed enough and the uneven wear may not be inhibited. On the other hand, when the width exceeds 10.0 mm, it gets difficult to provide the wearing region on the side portions. Further, when said first sipes and said second sipes are shallower than the above mentioned range, the rigidity of the wearing region becomes so high that the motion of the wearing region is inhibited and the effect of inhibiting uneven wear cannot be obtained enough. Further, since the sipes disappear in an early stage, the effect of inhibiting uneven wear also disappears in an early stage. On the other hand, when said first sipe and said second sipe are deeper than the above mentioned range, the rigidity of the wearing region becomes so low that the wearing region may be damaged and lost.

DETAILED DESCRIPTION OF THE INVENTION

Figure 1:
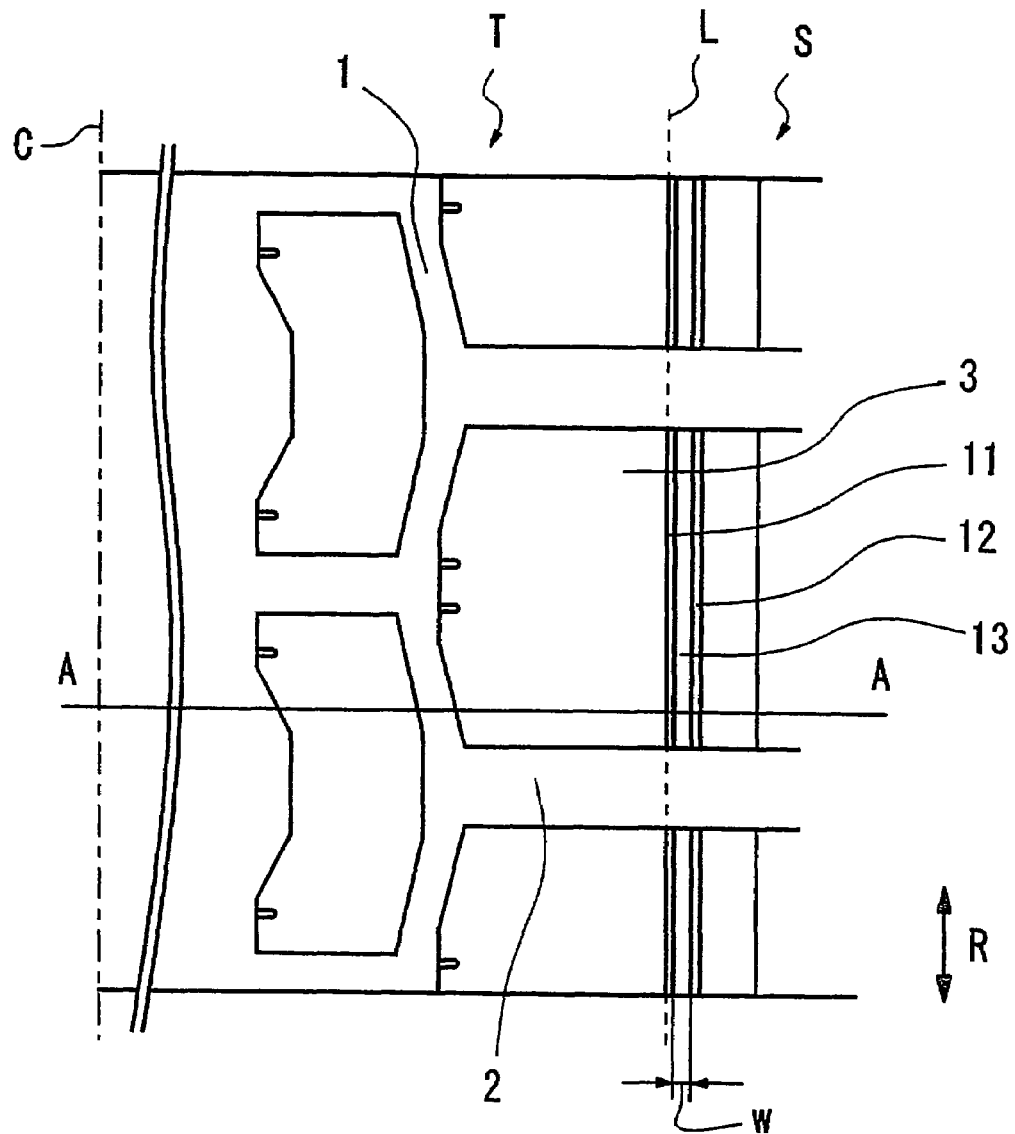
FIG. 1 shows a tread pattern of a pneumatic tire according to the present invention.

Hereinafter, the embodiments of a pneumatic tire of the present invention are explained using figures. FIG. 1 shows a part of a right half of a tread pattern of a pneumatic tire of the present invention. In the figure, main groove 1 extending in the tire circumferential direction R and transverse grooves 2 connecting main grooves 1 are formed on tread T, and block 3 is formed by main grooves 1 and transverse grooves 2. Further, the first sipes 11 and the second sipes 12 extending in the tire circumferential direction R are formed on block 3 on shoulder portions of tread T. 13 is a wearing region sandwiched by the first sipe 11 and the second sipe 12.

Figure 2:
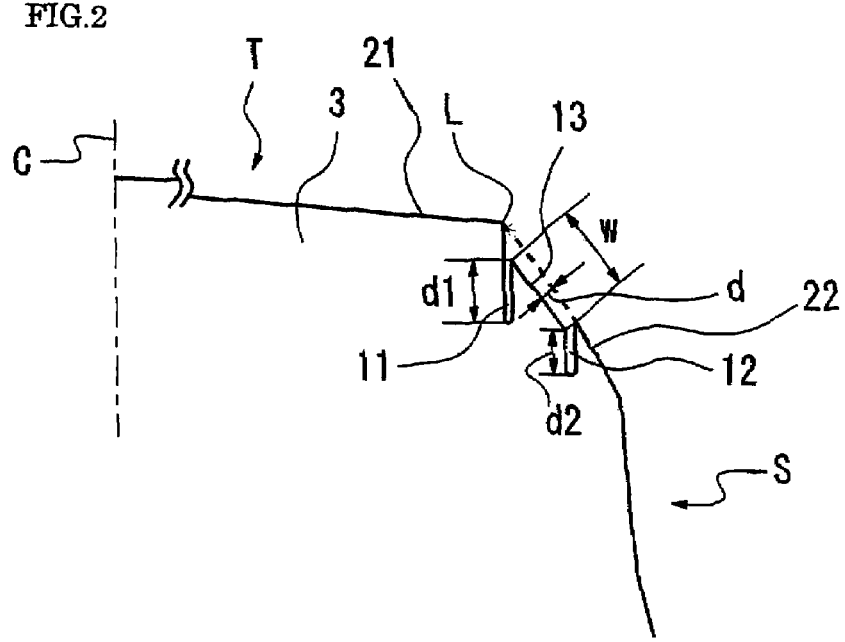
FIG. 2 is a cross section taken along the line A-A of FIG. 1.

FIG. 2 is a cross section taken along the line A-A of FIG. 1. As shown in the figure, the depth directions of the first sipe 11 and the second sipe 12 are parallel to tire equatorial plane C. L is the intersection line between surface 21 of tread T and taper surface 22 of side portion S, and the first sipe 11 is formed on the intersection line L and the second sipe 12 is formed further outside of the tire width direction from the intersection line L. In addition, the wearing region 13 is sunk in by d from the taper surface 22 and the width of the wearing region 13 is w. Further, d2, the depth of the second sipe 12 is deeper than d1, the depth of the first sipe 11 and the width of the second sipe 12 is wider than the width of the first sipe 11.

Figure 3:
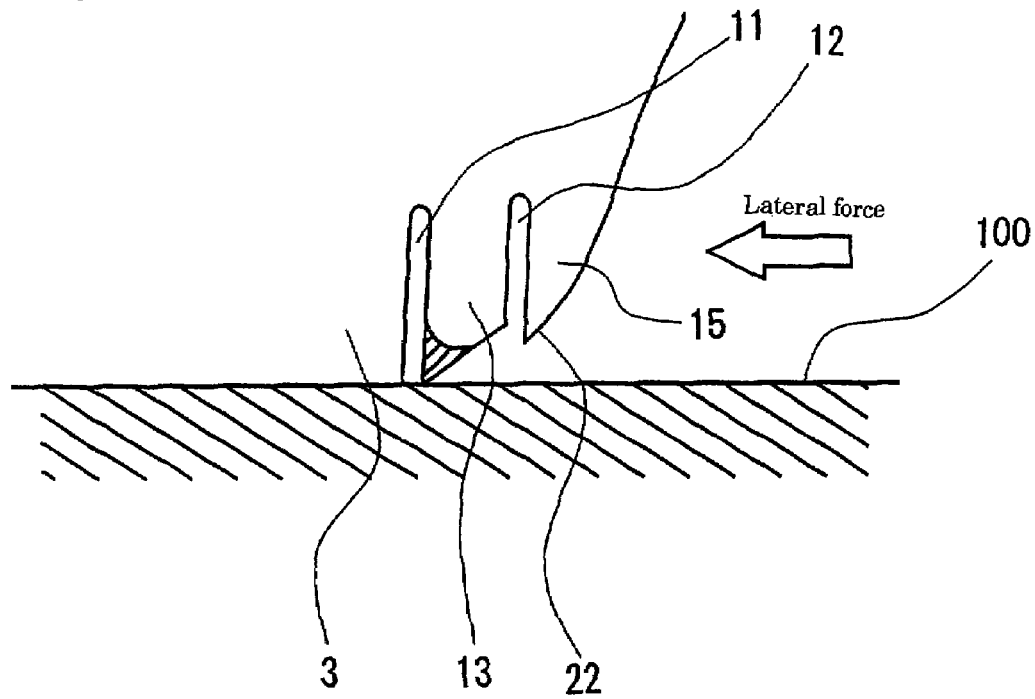
FIG. 3 is a cross section showing the grounding state of a pneumatic tire according to the present invention.

FIG. 3 is a cross section in the vicinity of the shoulder portion when the tire is subject to a lateral force in a grounding state. By the deformation of the tire, fallen wearing region 13 makes slide contact with road surface 100 thereby absorbing friction energy from the road surface. As a result, wearing is inhibited from progressing toward inside of the tire width direction, thereby capable of inhibiting uneven wear.

The second sipe 12 outside of the tire width direction has deeper depth and has wider width than the first sipe 11. In addition, since a surface of the wearing region 13 is more low-positioned than the surface of the side portion S, the wearing region 13 is unlikely to fall inside of the tire width direction even by the lateral force from the road surface. As a result, friction energy can be absorbed enough thereby capable of inhibiting uneven wear. Further, since sipes 11 and 12 are formed on the intersection line L between the tread surface 21 and the surface of the side portion S and outside of the intersection line L in the tire width direction, the grounding end is not narrowed and performances of the tire are not degraded.

Figure 4:
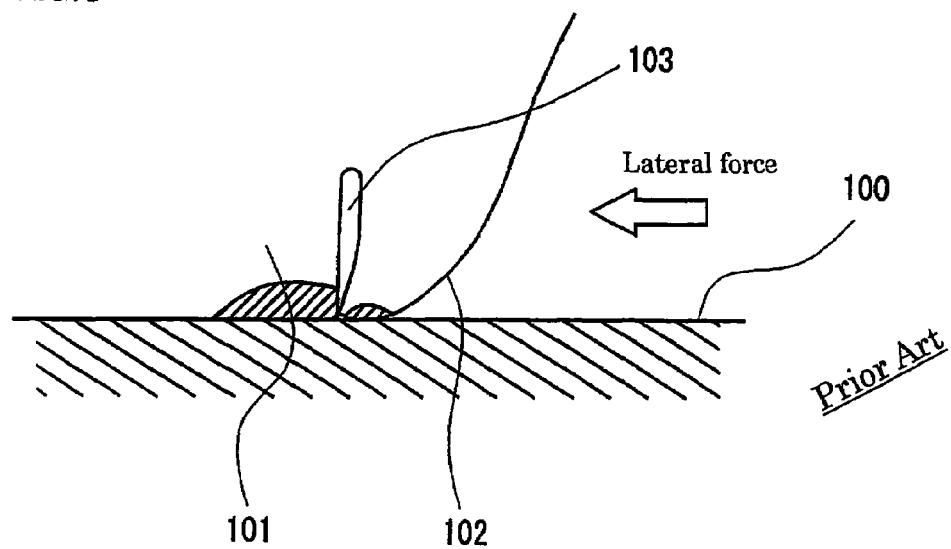
FIG. 4 is a cross section showing the grounding state of a conventional pneumatic tire.

On the other hand, in the conventional tires, as shown in FIG. 4, wearing region 103 further outside of the tire width direction from sipe 103 falls in the side of block 102. As a result, the wearing region 103 cannot absorb the friction energy from the road surface enough, and wearing progresses toward block 102, thereby causing uneven wear. In addition, depending on the position of the sipe, since it may narrow the width between the grounding ends, it may degrade various performances of tires. For information, in FIGS. 3 and 4, an oblique line portion of the cross section of the tire shows the region to be worn.

The height differenced between the surface of the wearing region 13 and the taper surface 22 of the side portion S can be not greater than 2.0 mm and can be 0.0 mm, however, it is more preferable to be 0.5 to 2.0 mm. When the height difference d is less than 0.5 mm, due to the lateral force from the road surface, the wearing region 13 is likely to fall inside of the tire width direction, thereby sometimes degrading the effect of inhibiting uneven wear. On the contrary, when the height difference exceeds 2.0 mm, the contact between the wearing region 13 and the road surface becomes unsatisfactory, thereby sometimes degrading the effect of inhibiting uneven wear as well. For information, the height difference d is a distance equivalent to the perpendicular line from the taper surface 22 to the surface of the wearing region 13.

It is preferable that w, the width of the wearing region 13 is 2.5 to 10.0 mm. When the width w is less than 2.5 mm, friction energy cannot be absorbed enough and uneven wear may not be inhibited. On the other hand, when the width w exceeds 10.0 mm, providing the wearing region 13 on the side portion S becomes difficult.

In the pneumatic tire of the present invention, it is also preferable that d1, the depth of the first sipes 11 and d2, the depth of the second sipes 12 are 40 to 60% and 45 to 70% of the depth of main groove 1. When the depth of the first sipes 11 and the second sipes 12 is shallower than the above mentioned range, the rigidity of the wearing region 13 becomes so high that the motion of the wearing region 13 is inhibited and the effect of inhibiting uneven wear cannot be obtained enough. Further, since sipes 11 and 12 disappear in an early stage, the effect of inhibiting uneven wear is also diminished in an early stage. On the other hand, when said first sipes 11 and said second sipes 12 are deeper than the above mentioned range, the rigidity of the wearing region 13 becomes so low that the wearing region 13 may be damaged and lost.

It is preferable that w1, the width of the first sipe 11 and w2, the width of the second sipes 12 are 0.3 to 2.0 mm and 0.5 to 3.0 mm, respectively. When w1, the width of the first sipes 11 and w2, the width of the second sipes 12 are less than 0.3 mm, the sipes open and close as the tire rolls, which is likely to cause cracks at the bottom of the sipes. On the other hand, when w1, the width of the first sipes 11 exceeds 2.0 mm or when w2, the width of the second sipe 12 exceeds 3.0 mm, since the rigidity of the wearing region 13 becomes so low that the wearing region 13 flanks. As a result, the wearing region 13 cannot keep a proper position, cannot get satisfactory sliding contact to the road surface, and the friction energy cannot be absorbed enough, thereby degrading the effect of inhibiting uneven wear. Further, it is preferable that w2, the width of the second sipes 12 is wider than w1, the width of the first sipes 11. When width w1 is wider than width w2, deformation of the wearing region 13 at the time of grounding is greatly affected by the portion 15 that is further outside from the sipe 12. As a result, the wearing region 13 is pulled to the direction apart from block 3 of the shoulder portion (outward of the tire width direction), and friction energy cannot be absorbed enough, thereby degrading the effect of inhibiting uneven wear.

Figure 5:
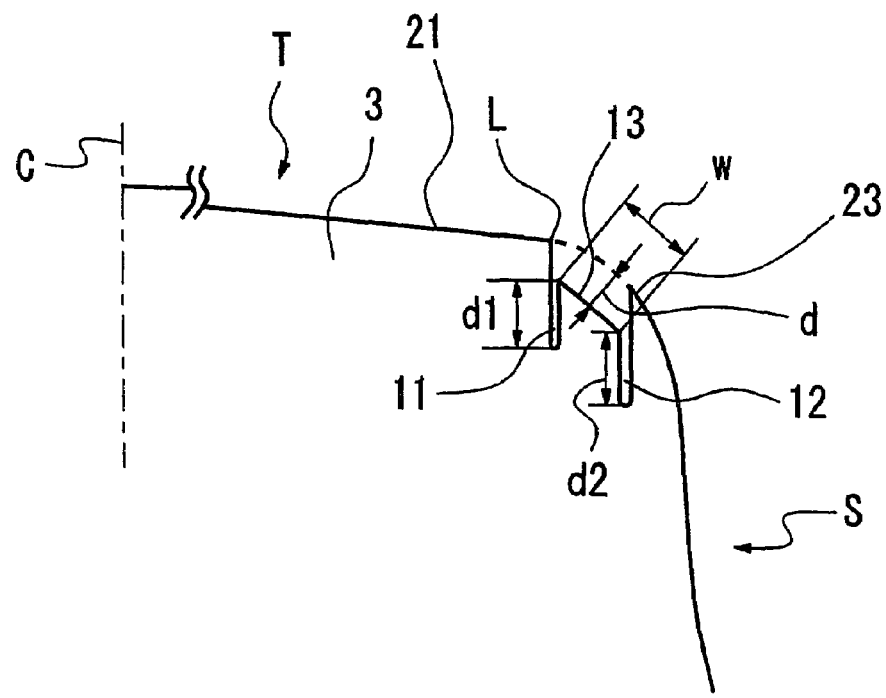
FIG. 5 is a cross section taken along the line A-A of FIG. 1 in a round shoulder embodiment of the present invention.

Further, as shown in FIG. 5, the configuration of the present invention can be applied to a tire in which shoulder portions of a tread is round shoulders. In this case, by forming the first sipes 11 on an intersection line L between tread surface 21 and shoulder round surface 23 of the shoulder portion and by forming the second sipe 12 further outside of the tire width direction, the above mentioned inhibition effect of uneven wear can be obtained. Further, the same kind of effect can be obtained when applied to a tire in which ribs are formed in the shoulder portions of the tread as well.

EXAMPLE

First, the values of friction energy generated in the vicinity of shoulder portions with tires in a grounding state were calculated by a finite element method (FEM) analysis. The examples 1 to 7 are tires related to the present invention and have shapes of shoulder portions as shown in FIGS. 1 and 2, the first sipes and the second sipes are formed, and the wearing region sandwiched by said sipes are sunk from side portions. Comparative Example 1 shows a tire that does not have sipes and a wearing region on shoulder portions. Comparative Example 2 shows a tire that has the first sipes only and has the wearing region further outside of the tire width direction from the first sipes and the first sipes are formed further inside of the tire width direction by 5.0 mm from the intersection line L between the tread and the side portion.

Comparative Example 3 shows a tire in which the first sipes are more deeply formed than the second sipes. Comparative Example 4 shows a tire with the same sipe size as in Example 1 but the height difference d is rather large, i.e, 2.5 mm.

Condition of analysis is as follows and the friction energy in the region further inside of the tire width direction from the intersection line L between the tread and the side portion (grounding end portion) and the region further outside of the tire width direction from intersection line L (wearing region) is shown in table 1. In table 1, values are represented in indices defining friction energy at a grounding end of Comparative Example 1 as 100.

Condition of Analysis
Tire size: 11R22.5
Load: 278(N)
Slip angle: 0.2 degree
Depth of main grooves: 16.0 mm is likely to fall inside of the tire width direction, and therefore, friction energy is small at a grounding end. In Comparative Example 4, since the height difference d is too big, the contact between the wearing region and the road surface becomes unsatisfactory and the friction energy is small at the grounding end. Therefore, the tire of the present invention is found to have high inhibition effect of uneven wear.

Next, tires of Examples 1 to 7 and Comparative Examples 1 to 4 were manufactured experimentally and after imposing on a rim with a size of 22.5×7.5, air was filled with inner pressure of 700 kPa thereby installing in a front wheel of a heavy truck with a gross weight of 20 tons. This heavy truck was driven on a pavement with a load equivalent to 80% of the maximum payload, thereby measuring uneven wear amount. The result is shown in Table 2 that shows the generation of uneven wear was inhibited in the tires of Examples 1 to 7 as was shown by numerical analysis. In particular, by making height difference d within the range of 0.5 to 2.0 mm, uneven wear could effectively be inhibited.

TABLE 2

|  |  | Example | | | | | | | Comparative Example | | | |
|---|---|---|---|---|---|---|---|---|---|---|---|---|
|  |  | 1 | 2 | 3 | 4 | 5 | 6 | 7 | 1 | 2 | 3 | 4 |
| Uneven wear amount (mm) | Driving 6300 km | 0.0 | 0.0 | 0.0 | 0.0 | 0.2 | 0.0 | 0.0 | 0.3 | 0.3 | 0.3 | 0.3 |
|  | Driving 17000 km | 0.4 | 0.8 | 0.7 | 0.6 | 1.1 | 0.6 | 0.8 | 1.4 | 1.1 | 1.2 | 1.3 |

What is claimed is:

1. A pneumatic tire provided with a pair of bead portions, a tread, and side portions that connect said bead portions and said tread, with a plurality of grooves that include main grooves extending in the tire circumferential direction formed on said tread, and ribs and/or blocks formed on shoulder portions of said tread by said grooves, wherein on intersection

TABLE 1

|  | Examples | | | | | | | Comparative Examples | | | |
|---|---|---|---|---|---|---|---|---|---|---|---|
|  | 1 | 2 | 3 | 4 | 5 | 6 | 7 | 1 | 2 | 3 | 4 |
| First sipe depth d1 (mm) | 4.7 | 4.7 | 4.7 | 4.7 | 4.7 | 7.5 | 2.5 | — | 4.7 | 9.5 | 4.7 |
| Second sipe depth d2 (mm) | 9.5 | 9.5 | 9.5 | 9.5 | 9.5 | 10.0 | 6.0 | — | — | 4.7 | 9.5 |
| First sipe width w1 (mm) | 0.4 | 0.4 | 0.4 | 0.4 | 0.4 | 0.4 | 0.4 | — | 0.4 | 0.7 | 0.4 |
| Second side width w2 (mm) | 0.7 | 0.7 | 0.7 | 0.7 | 0.7 | 0.7 | 0.7 | — | — | 0.4 | 0.7 |
| Wearing region width w (mm) | 3.0 | 3.0 | 3.0 | 3.0 | 2.0 | 3.0 | 3.0 | — | — | 3.0 | 3.0 |
| Height difference of wearing region d (mm) | 1.5 | 0.0 | 0.5 | 2.0 | 1.5 | 1.5 | 1.5 | — | — | 1.5 | 2.5 |
| Friction energy | Grounding end | 27 | 34 | 31 | 28 | 41 | 29 | 33 | 100 | 46 | 54 | 68 |
|  | Wearing region | 76 | 61 | 67 | 71 | 52 | 71 | 58 | — | 48 | 46 | 36 |

Depth of main grooves: 16.0 mm

According to table 1, in Examples 1 to 7, by forming two sipes, compared with Comparative Example 2, satisfactory level of friction energy is generated in a wearing region. In addition, in Comparative Example 3, since the first sipes are more deeply formed than the second sipes, the wearing region lines between a surface of said tread and a surface of said side portions, the first sipes extending in the tire circumferential direction are formed and second sipes extending in the tire circumferential direction are formed further outside of the tire width direction from said first sipes, the depth directions of said first sipes and said second sipes are parallel to the tire equatorial plane, said second sipes are deeper than said first sipes, and said second sipes are wider than said first sipes, and the height difference between a surface of a wearing region sandwiched by said first and second sipes and a surface of said side portion is between 0.5 mm and 2.0 mm wherein the intersection lines define the grounding end portions of the tread.

2. The pneumatic tire as set forth in claim 1, wherein the width of said wearing region is 2.5 to 10.0 mm, the width of said first sipes and second sipes is 0.3 to 2.0 mm and 0.5 to 3.0 mm, respectively, the depth of said second sipes is 40 to 60% of the depth of said main grooves, and the depth of said first sipes is 45 to 70% of the depth of said second sipes.

* * * * *